(12) United States Patent
Shibata et al.

(10) Patent No.: US 9,596,416 B2
(45) Date of Patent: Mar. 14, 2017

(54) MICROSCOPE SYSTEM

(71) Applicant: OLYMPUS CORPORATION, Tokyo (JP)

(72) Inventors: Motohiro Shibata, Tokyo (JP); Shinichiro Aizaki, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 492 days.

(21) Appl. No.: 13/898,581

(22) Filed: May 21, 2013

(65) Prior Publication Data

US 2013/0329033 A1 Dec. 12, 2013

(30) Foreign Application Priority Data

Jun. 12, 2012 (JP) ................................ 2012-133004

(51) Int. Cl.
*H04N 9/77* (2006.01)
*H04N 5/235* (2006.01)
*H04N 5/357* (2011.01)
*G02B 21/36* (2006.01)

(52) U.S. Cl.
CPC ......... *H04N 5/2355* (2013.01); *G02B 21/365* (2013.01); *H04N 5/3572* (2013.01)

(58) Field of Classification Search
None
See application file for complete search history.

(56) References Cited

U.S. PATENT DOCUMENTS

| 7,184,610 | B2* | 2/2007 | Weinstein et al. | 382/284 |
| 7,864,369 | B2* | 1/2011 | Olszak et al. | 358/1.9 |
| 2004/0141087 | A1* | 7/2004 | Oda | H04N 9/045 348/340 |
| 2012/0106310 | A1* | 5/2012 | Shinoda | G11B 7/0903 369/109.01 |
| 2012/0237137 | A1* | 9/2012 | Chen | G02B 21/008 382/284 |
| 2013/0155499 | A1* | 6/2013 | Dixon | G02B 21/002 359/385 |

FOREIGN PATENT DOCUMENTS

| JP | 2006-171213 A | 6/2006 |
| JP | 2008-051773 A | 3/2008 |

* cited by examiner

*Primary Examiner* — Christopher Findley
(74) *Attorney, Agent, or Firm* — Scully, Scott, Murphy & Presser, P.C.

(57) ABSTRACT

A microscope system comprises: a stage carrying a sample; an optical system forming an sample image; a driver driving at least the optical system or stage to relatively moves the sample and optical system; an imaging section capturing a reference viewing field image as an image of a predetermined viewing field range of the sample and peripheral viewing field images each being an image of a peripheral viewing field range containing a predetermined region in the predetermined viewing field range and different from the predetermined viewing field range, by the driver moving the relative position of the sample; a correction gain calculator calculating a correction gain of each pixel of the reference viewing field image based on the reference viewing field image and peripheral viewing field image; and a corrector performing shading correction on the reference viewing field image based on the calculated correction gain.

4 Claims, 13 Drawing Sheets

FIG. 8
(A)
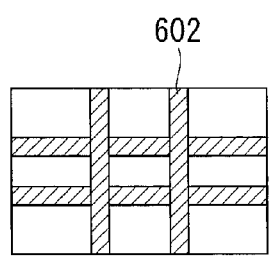
(B)
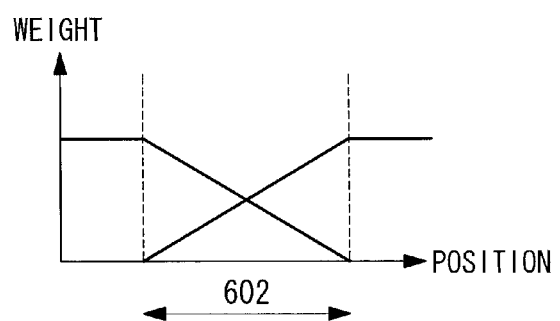
FIG. 9
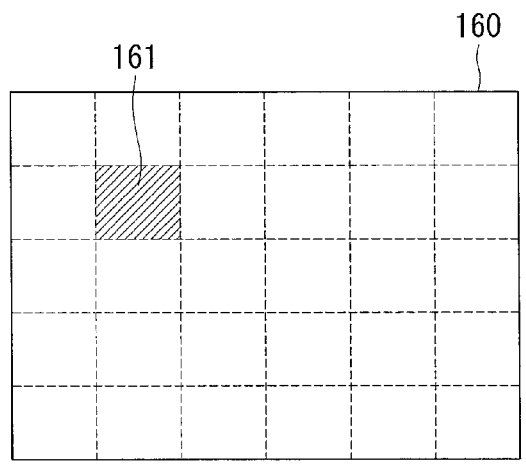

MICROSCOPE SYSTEM

TECHNICAL FIELD

The present invention relates to a microscope system.

BACKGROUND ART

A virtual slide is known in which pieces of partial image data obtained by imaging respective parts of a sample on a slide glass at a high resolution using a microscope are connected to obtain image data of an entire sample, so that such image data can be displayed on a display of PC or the like as a microscope image for observing.

When an image is captured with a microscope, shading occurs which means unevenness in luminosity caused by unevenness in light source, non-uniformity of an optical system, an issue of an imaging element, or the like. Where shading occurs, the more distant the place is from the optical axis, it becomes darker. As a result, in a case where pieces of partial image data are connected together like a virtual slide, failure may occur such as unnatural border generated at a border portion between pieces of partial image data, or a shading that itself looks like a pattern of a sample.

To cope with this, a method is known which involves acquiring a pattern of shading as a calibration image in advance and performing correction based on the calibration image. Patent literature 1 describes a microscope system for performing such correction, in which image data for calibration is obtained by escaping a sample when observing in transmission illumination and by reflecting light when observing in epi-illumination, so that, even if illumination unevenness changes when illumination light is switched to change shading, the shading can be suppressed. Further, patent literature 2 describes a fluorescence image acquiring device which performs imaging with a uniform fluorescence sample as a calibration sample at the time of fluorescence observation.

CITATION LIST

Patent Literature

{PTL 1}
Japanese Unexamined Patent Application, Publication No. 2006-171213
{PTL 2}
Japanese Unexamined Patent Application, Publication No. 2008-51773

SUMMARY OF INVENTION

Technical Problem

However, the microscope system described in patent literature 1 may be cumbersome to use because a sample under observation is required to be temporarily removed to obtain image data for calibration. Further, in a case where a calibration sample is used according to patent literature 2, it is required that the calibration sample is not damaged nor dust sticks to it, which makes management of the calibration sample cumbersome. Furthermore, it is difficult to generate a uniform fluorescence sample that is appropriate for a calibration sample, otherwise, desired correction may not be attained.

Solution to Problem

The present invention provides a microscope system comprising: a stage on which a sample is placed; an optical system for forming an image of the sample; a drive section which drives at least one of the optical system and the stage to move the sample and the optical system relative to each other; an imaging section which captures a reference viewing field image that is an image of a predetermined viewing field range of the sample, and captures a plurality of peripheral viewing field images each of which is an image of a peripheral viewing field range that contains a predetermined region in the predetermined viewing field range and different from the predetermined viewing field range, by causing the drive section to move a position of the sample relative to the optical system; a correction gain calculation section which calculates a correction gain of each pixel of the reference viewing field image based on the reference viewing field image and the peripheral viewing field image; and a correction section which performs shading correction on the reference viewing field image based on the correction gain calculated by the correction gain calculation section.

BRIEF DESCRIPTION OF DRAWINGS

FIG. 8 is an explanatory view representing examples of the reference viewing field image and the peripheral viewing field image;

FIG. 9 is an explanatory view representing examples of the reference viewing field image and the peripheral viewing field image;

DESCRIPTION OF EMBODIMENTS

First Embodiment

A microscope system in a first embodiment of the present invention is described below in reference to a figure.

Figure 1:
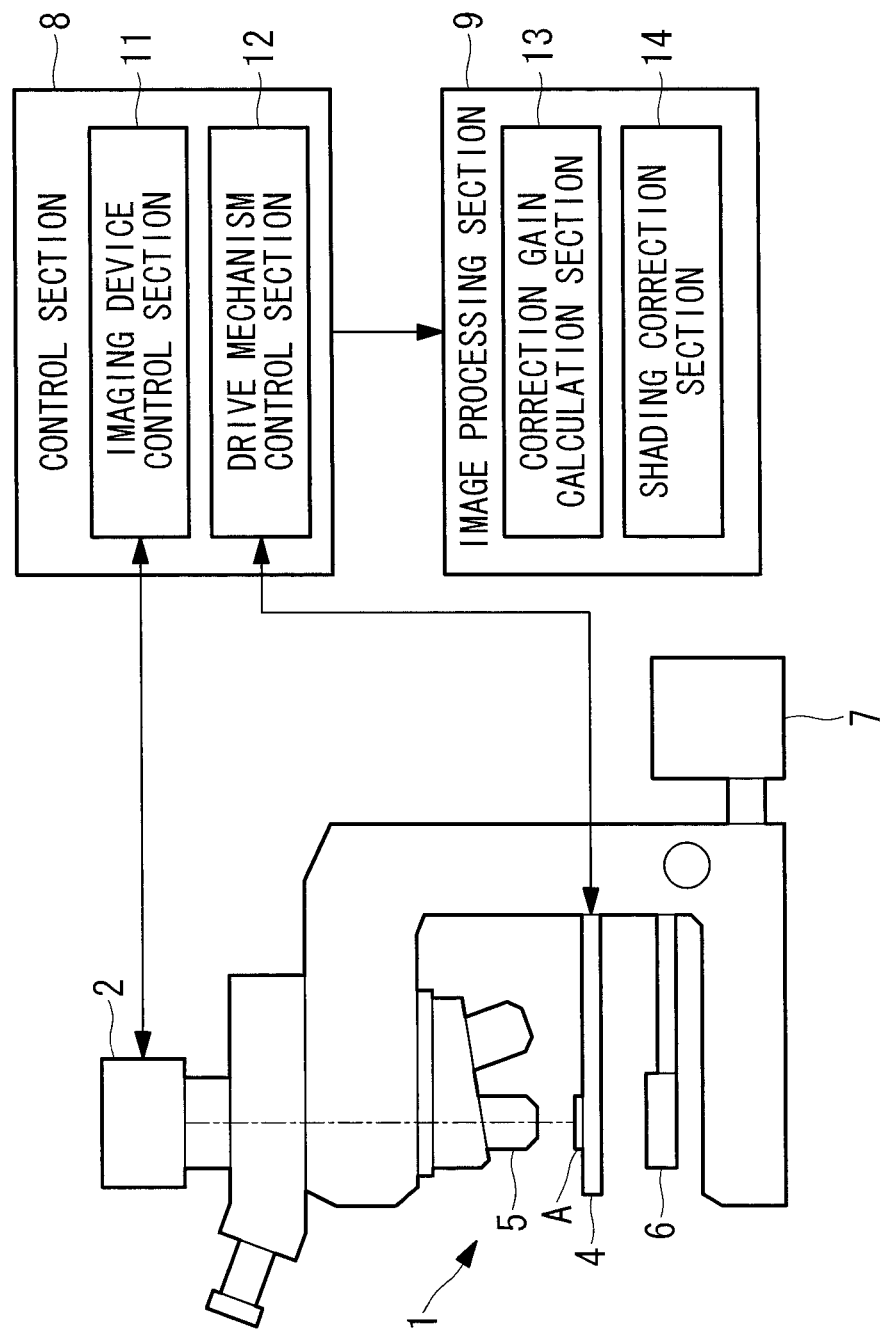
FIG. 1 is an overall configuration diagram representing a microscope system in a first embodiment of the present invention.

As shown in FIG. 1, the microscope system includes a microscope device 1 for observing a sample (specimen) A, an imaging device 2 which captures an observation image of the sample A obtained by the microscope device 1, a control section 8 for controlling the microscope device 1 and the imaging device 2, and an image processing section 9 which applies a predetermined process on an image obtained with the imaging device 2.

The illumination light emitted from a light source 7 of the microscope device 1 illuminates the sample A set on a stage 4 through a condenser unit 6, and an image of the sample A is focused on an imaging plane of the imaging device 2 by way of an objective lens 5 and a focusing lens which is not shown in a figure (optical system).

Figure 2:
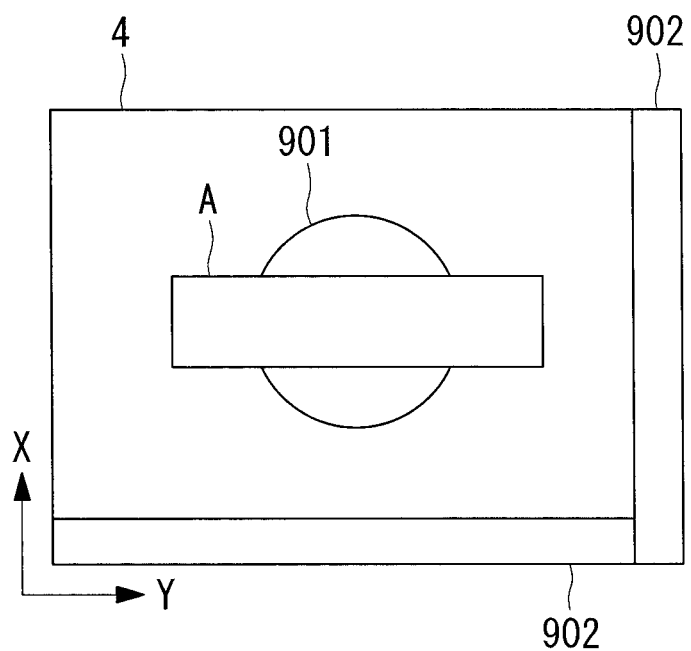
FIG. 2 is an elevation view of a stage of the microscope system in one embodiment of the present invention.

The stage 4 of the microscope device 1 is driven by a drive mechanism control section 12 which will be stated below, thereby the sample A is moved relative to the optical system including the objective lens 5 and the focusing lens. FIG. 2 is an elevation view in which the stage 4 is looked down upon from the objective lens 5 side. As shown in FIG. 2, the stage 4 is secured to a holder 902, and a stepping motor is connected to the holder 902 using a ball screw which is not shown in a figure.

The stage 4 is driven in XY direction (direction orthogonal to the optical axis of the objective lens 5) in FIG. 2 when the drive mechanism control section 12 drives the stepping motor. As a result, the sample A is moved relative to the optical system, and furthermore relative to the imaging device 2. By moving the sample A and the imaging device 2 relative to each other, a position which is illuminated by the light from the light source 7 that passes through an illumination opening 901 and an image that is focused on the imaging element of the imaging device 2 are moved.

Note that a means (actuator) for driving the stage 4 is not limited to a ball screw and a stepping motor, and an ultrasonic motor, for example, may be used.

Further, the drive mechanism control section 12 controls drive position by informing drive coordinates to an operator, which is available by image matching such as template matching from an image obtained with the imaging device 2. It should be noted that a way of acquisition of the drive coordinates is not limited to image matching, and a value of the scale mounted on the stage 4, for example, may be used.

The imaging device 2 is a digital camera equipped with an imaging element such as CCD, and CMOS, and it forms a focused image and outputs the image as a digital image to the control section 8. The imaging device 2 is controlled by an imaging device control section 11 which is described later, for capturing a reference viewing field image (see FIG. 3(A)) which is an image of a predetermined viewing field range of the sample A. It also captures a plurality of peripheral viewing field images (see FIG. 3(B) to FIG. 3(E)) each of which is an image of peripheral viewing field range that contains a predetermined region at the center of the predetermined viewing field range and different from the predetermined viewing field range by causing the drive mechanism control section 12 to drive the stage 4 so that the position of a sample A is moved relative to the optical system.

The control section 8 includes the imaging device control section 11 which controls the imaging device 2 and the drive mechanism control section 12 that controls the stage 4. The control section controls the imaging device 2 through the imaging device control section 11 and the stage 4 through the drive mechanism control section 12 respectively, so as to acquire images at a predetermined position in predetermined numbers. More specifically, it acquires a reference viewing field image which is an image of the predetermined viewing field range, and a plurality of peripheral viewing field images each of which is an image of peripheral viewing field ranges that contains a predetermined region at the center of the predetermined viewing field range and different from the predetermined viewing field range, and then outputs the images that have been obtained to an image processing section 9.

The image processing section 9 includes a correction gain calculation section 13 and a shading correction section 14. The correction gain calculation section 13, based on the reference viewing field image and the peripheral viewing field image that have been inputted from the control section 8, calculates a correction gain for each pixel of the reference viewing field image. The shading correction section 14, according to the correction gain available from the correction gain calculation section 13, performs shading correction on the reference viewing field image to acquire an image in which shading has been corrected.

Note that, shading means unevenness in luminosity caused by unevenness in light source, non-uniformity of optical system, an imaging element of imaging device or the like, and the shading correction means correcting of unevenness like these.

Figure 4:
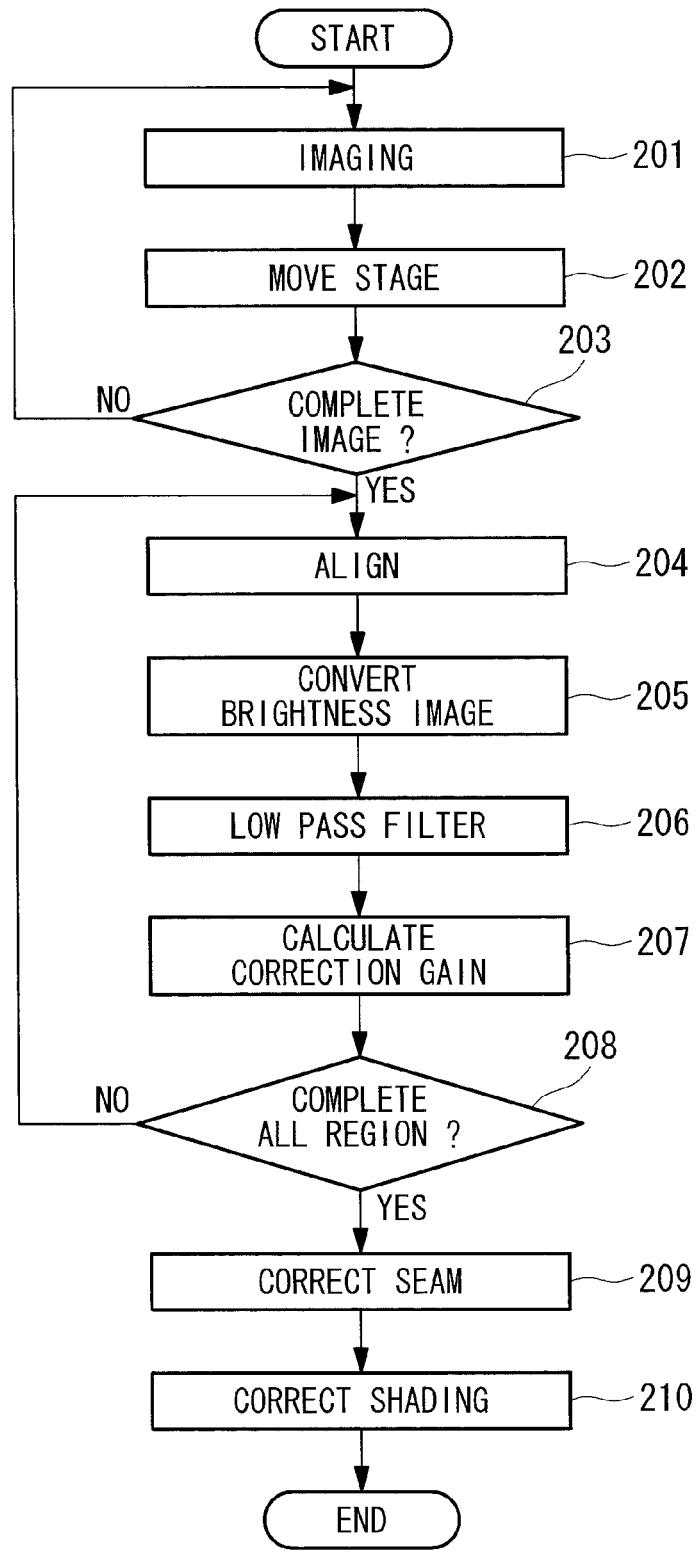
FIG. 4 is a flow chart about shading correction in the microscope system in the first embodiment of the present invention.

Hereinafter, flow of shading correction in the microscope system of the present invention is described according to a flow chart in FIG. 4. In one embodiment, the stage 4 can move a position of the sample A relative to an optical system, or the imaging device 2, by 1/3 each in height direction (Y direction) and width direction (X direction) of the reference viewing field image. Here, the imaging device 2 captures four peripheral viewing field images that are images of peripheral viewing field ranges that contain a predetermined range at the center of the predetermined viewing field range and different from the predetermined viewing field range by deviation of ⅓ each at least in one of height direction and width direction.

In step 201, a reference viewing field image of a predetermined viewing field range is captured. In step 202, the stage 4 is driven to move the sample A and the imaging device 2 relative to each other so that a viewing field range becomes different. Returning to step 201 again, a peripheral viewing field image is captured. In step 202, the stage is moved again to provide a different viewing field image for a peripheral viewing field image. Then returning to step 201 again, a peripheral viewing field image is captured. By repeating the procedure described above, one reference viewing field image and four peripheral viewing field images are captured.

To be specific, in FIG. 3(A) to FIG. 3(E), 301 denotes a reference viewing field image (predetermined viewing field range), and 302, 303, 304, and 305 respectively denote peripheral viewing field images (peripheral viewing field ranges). In FIG. 3(B) to FIG. 3(E), the reference viewing field image 301 is shown with dotted line against the respective peripheral viewing field images 302, 303, 304, and 305.

Figure 3:
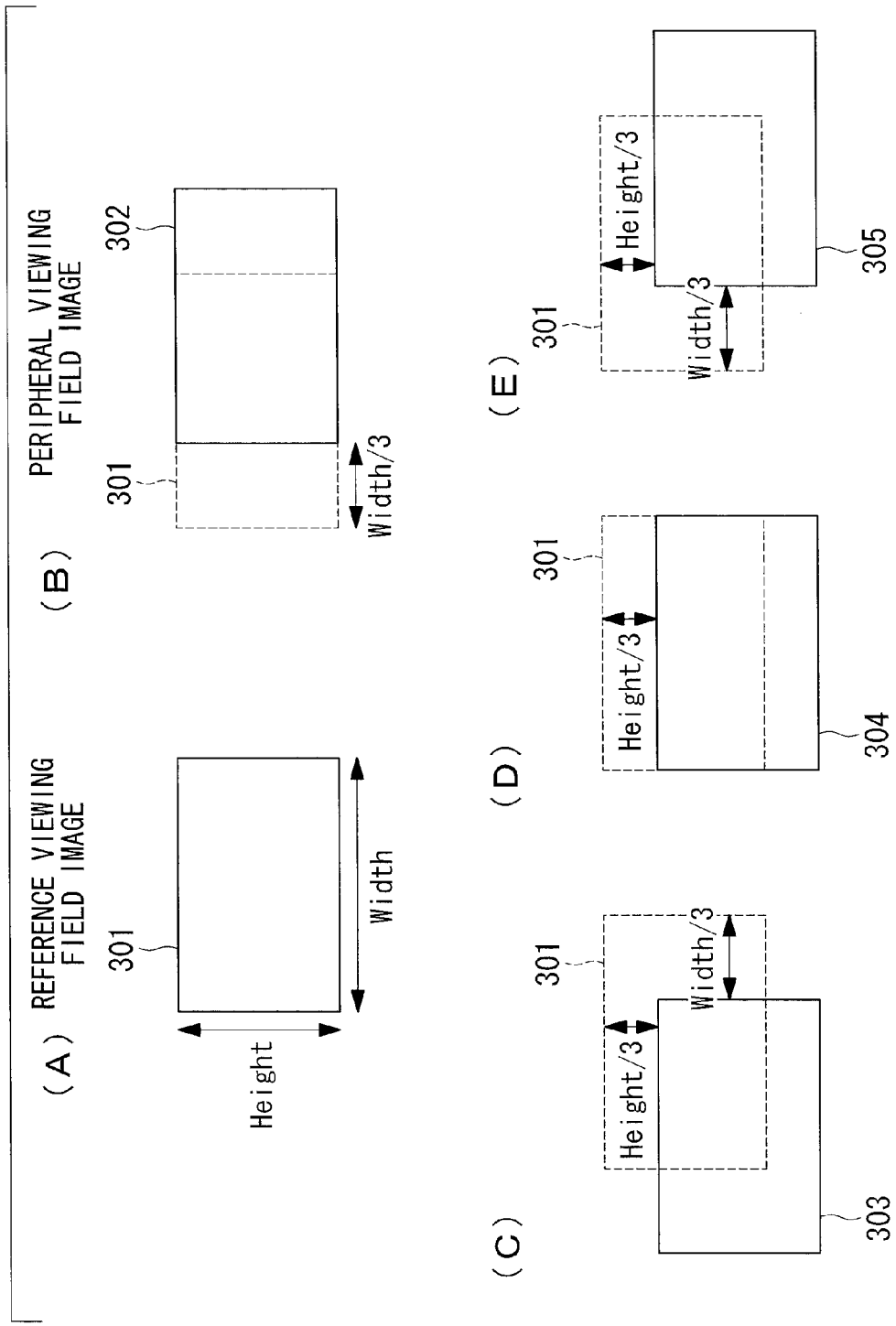
FIG. 3 is an explanatory view representing examples of a reference viewing field image and a peripheral viewing field image.

In other words, after the reference viewing field image 301 is captured (FIG. 3(A)), the stage 4 is driven rightward by 1/3 of the image width of the reference viewing field image, to image the peripheral viewing image 302 (FIG. 3(B)). The stage 4 is driven by 1/3 of the image height of the reference viewing field image downward and also by 1/3 of the image width leftward, to image the peripheral viewing field image 303 (FIG. 3(C)). The stage 4 is driven downward by ⅓ of the image height of the reference viewing field image, to image the peripheral viewing field image 304

(FIG. 3(D)). Lastly, the stage 4 is driven rightward by 1/3 of the image width of the reference viewing field image and by 1/3 of the image height downward, to image the peripheral viewing field image 305 (FIG. 3(E)). Thus imaging is completed in step 203 and a flow proceeds to next step 204.

Note that an order of imaging respective peripheral viewing field images is optional, and the reference viewing field image 301 and the peripheral viewing field images 302-305 may be in opposite relative positional relationship.

In step 204 to step 207, alignment with a reference viewing field image, brightness image conversion, low-pass filter process, and correction gain calculation are performed for each of all the peripheral viewing field images.

Figure 5:
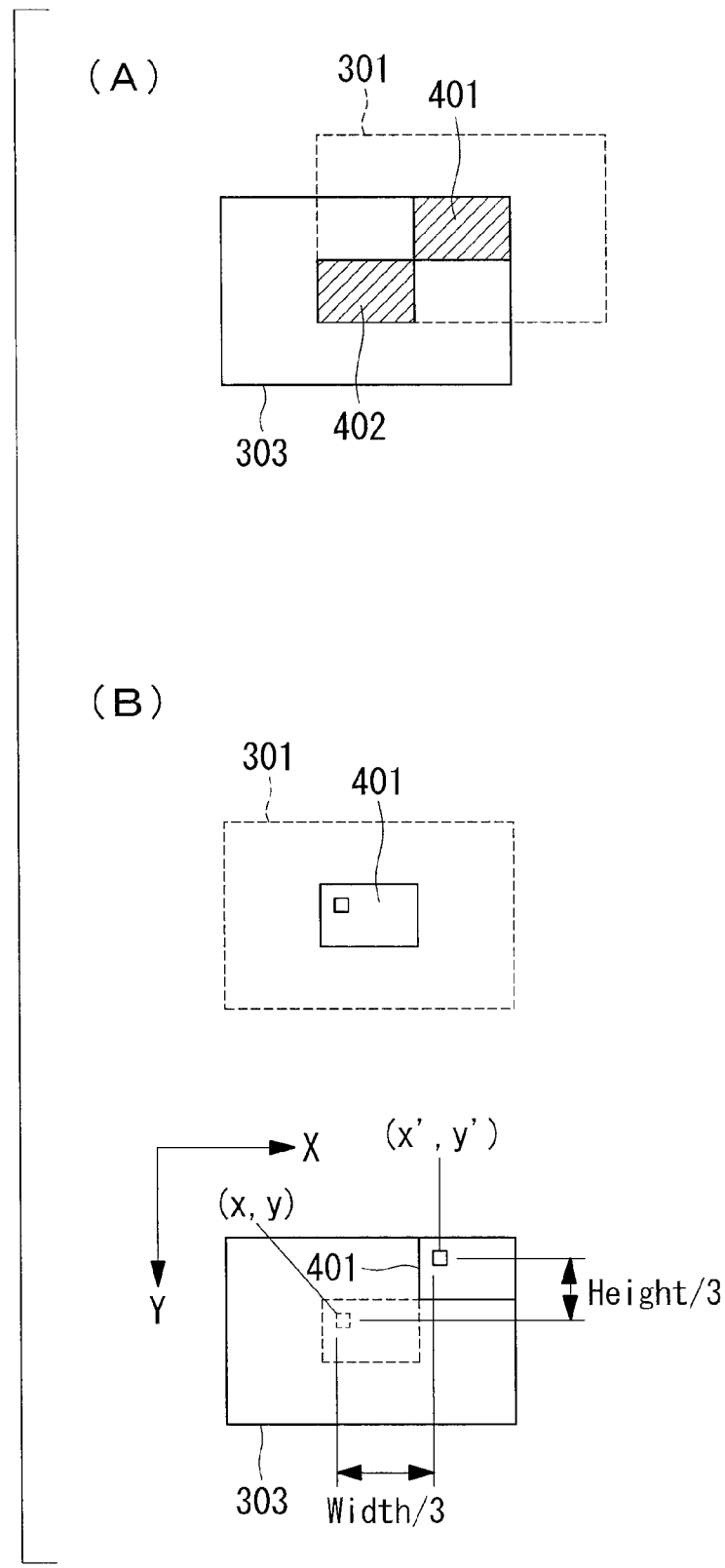
FIG. 5 is an explanatory view representing examples of the reference viewing field image and the peripheral viewing field image.

Note that, as shown in FIG. 5, the height and width of each image is divided in three sections for convenience sake, and each image includes a central region and eight peripheral regions which surround the central region, with each of height and width being 1/3. As an example, a region 401 shown in FIG. 5(A) is a central region of the reference viewing field image 301 and corresponds to a peripheral region of the peripheral viewing field image 303, and further, a region 402 is a peripheral region of the reference viewing field image 301 and corresponds to a central region of the peripheral viewing field image 303.

In step 204, the reference viewing field image is aligned with any one of the peripheral viewing field images. In short, by the driving method and the imaging method of the stage 4 described above, the reference viewing field image 301 and the peripheral viewing field image 303 are captured theoretically at the position shown in FIG. 5(A). However, deviation may occur because of issue of alignment accuracy or resolution for the stage 4. To cope with this, a scale value of the stage 4, the pulse number of a stepping motor, execution of matching using images, or combination of them is used for adjusting position, to allow a pixel of the reference viewing field image and that of the peripheral viewing field image to be associated with each other, for alignment.

Then, in next step 205, brightness image conversion is performed in a case where the reference viewing field image and the peripheral viewing field image are color images. In the aforementioned brightness conversion, RGB value may be subjected to weight addition, or an arbitrary value in RGB may be selected. In step 206, an image after brightness conversion is applied with a low-pass filter process. By this, an effect of alignment error or deviation caused by aberration may be corrected.

In short, such a problem is solved as, in a case where accurate positioning cannot be attained by alignment or in a case where alignment cannot be performed because of effect of distortion aberration or coma aberration, a structure will appear in a gain if the gain is calculated as it is. Since shading is generally present in a low frequency range, a low-pass filter is applied to suppress occurrence of structure component. Application of a low-pass filter may include application of convolution, for example, convolution of Gaussian filter in image processing or application of an average filter. It may also include application of a bandpass filter in a frequency range in which an image is Fourier transformed.

Figure 6:
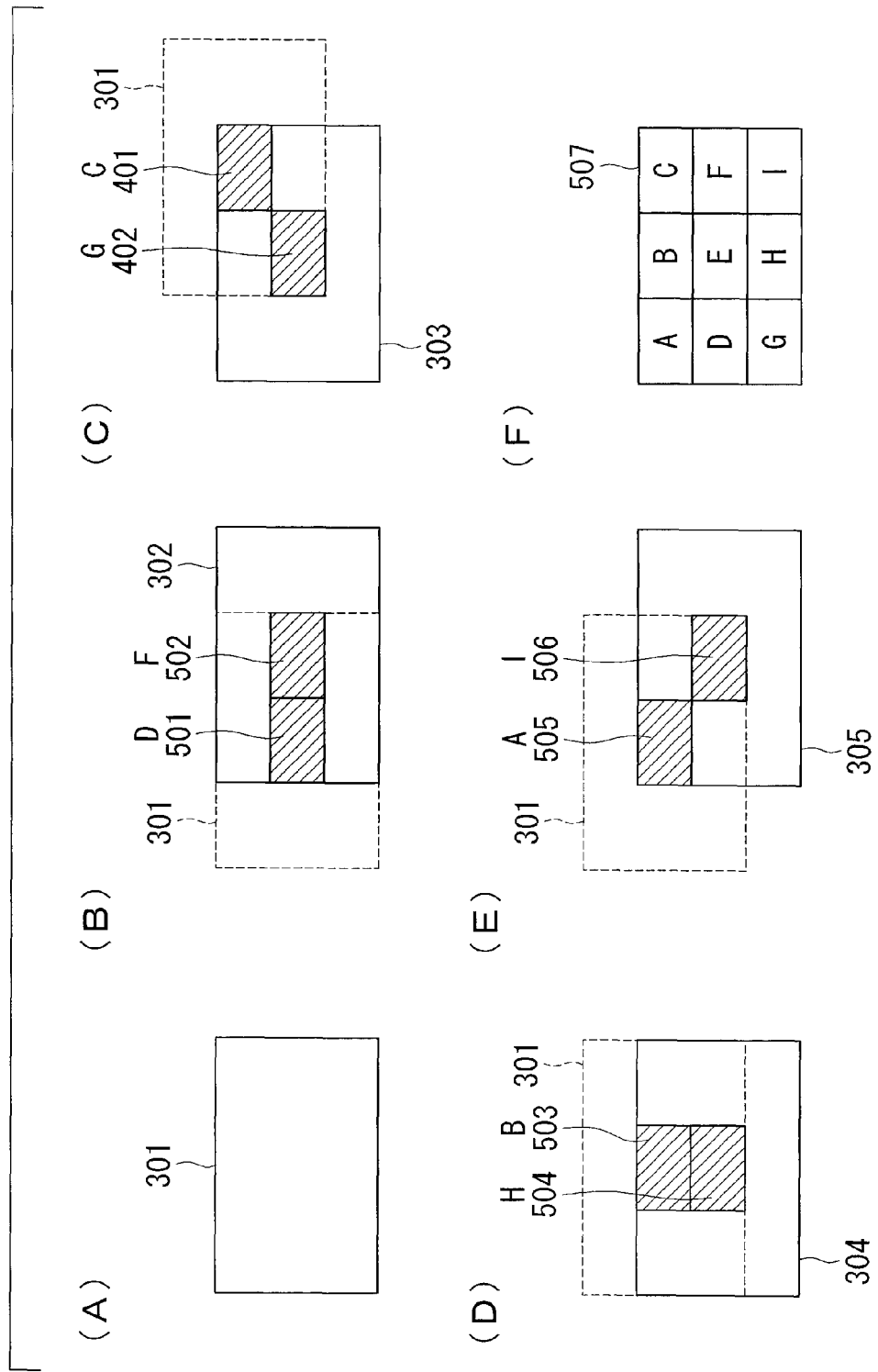
FIG. 6 is an explanatory view representing examples of the reference viewing field image and the peripheral viewing field image.

In next step 207, a correction gain is calculated with reference to FIG. 5(B) and FIG. 6. FIG. 6(F), for convenience sake, exemplifies an image 507 to have the same size and shape as the reference viewing field image or the peripheral viewing field image divided in three-by-three sections. A correction gain is calculated for peripheral regions A-I except for a central region E of the image 507.

The flow of correction gain calculation is to be explained with a peripheral viewing field image 303 as an example. As described above, a region 401 is a central region of the reference viewing field image 301 and corresponds to a peripheral region of the peripheral viewing field image 303, and a region 402 is a peripheral region of the reference viewing field image 301 and corresponds to a central region of the peripheral viewing field image 303.

Accordingly, the region 401 of the peripheral viewing field image 303 is used to calculate a correction gain of a region C of the division image 507, and the region 402 of the peripheral viewing field image 303 is used to calculate a correction gain of a region G in the division image 507.

It is assumed that height of a reference viewing field image is H, width is W, and the upper left of an image is origin, while the right side is X coordinate and the lower side is Y coordinate respectively. Here, a correction gain of the region C is to be calculated. With brightness value of coordinates (x', y') of the reference viewing field image 301 assumed as f (x', y') and brightness value of coordinates (x, y) corresponding to (x', y') of the peripheral viewing field image 303 as g (x, y), coordinates of the reference viewing field image 301 becomes (x', y')=(x−W/3, y+H/3). A gain GainC (x, y) of the region C is obtained through a formula (1) below.

$$\text{Gain}_C(x,y) = f(x',y')/g(x,y) \qquad (1)$$

Further, a correction gain of the region G is to be calculated. With brightness value of coordinates (x', y') of the reference viewing field image 301 assumed as f (x', y') and brightness value of coordinates (x, y) corresponding to (x', y') of the peripheral viewing field image 303 as g (x, y), coordinates of the reference viewing field image 301 becomes (x', y')=(x+W/3, y−H/3). A gain GainG (x, y) of the region C is obtained through a formula (2) below.

$$\text{Gain}_G(x,y) = f(x',y')/g(x,y) \qquad (2)$$

Accordingly, correction gain of each pixel in regions 401 and 402 of the reference viewing field image, in other words, the division region C and the division region G are calculated based on a ratio between the brightness of the peripheral region 401 of one peripheral viewing field image 303 which overlaps with the reference viewing field image 301 and the brightness of the central region 401 of the reference viewing field image, and a ratio between the brightness of the peripheral region 402 of the reference viewing field image 301 that overlaps with one peripheral viewing field image 303 and the brightness of the central region 402 of the peripheral viewing field image 303.

In a similar procedure, a correction gain of two regions can be calculated for one peripheral viewing field region. Further, by performing the alignment in step 204 to the calculation of correction gain in step 207 on each peripheral viewing field region, a correction gain can be calculated for A-I regions except for the region E. It is to be noted that the region E is a central region and, therefore, all correction gains are 1, and as a result, correction gains for the pixels are determined in all regions of the reference viewing field image. Step 208 determines that all of regions have been completed, and a flow proceeds to next step 209.

In step 209, seam correction is performed. The seam correction is to make a border portion smooth. It is performed because picture quality degrades, if mismatching occurs to be noticeable at a border among the regions A-I that are used for convenience sake for calculation of the correction gain described above. The seam correction is attained by applying a low-pass filter such as Gaussian filter for smooth connection at the seam.

Figure 7:
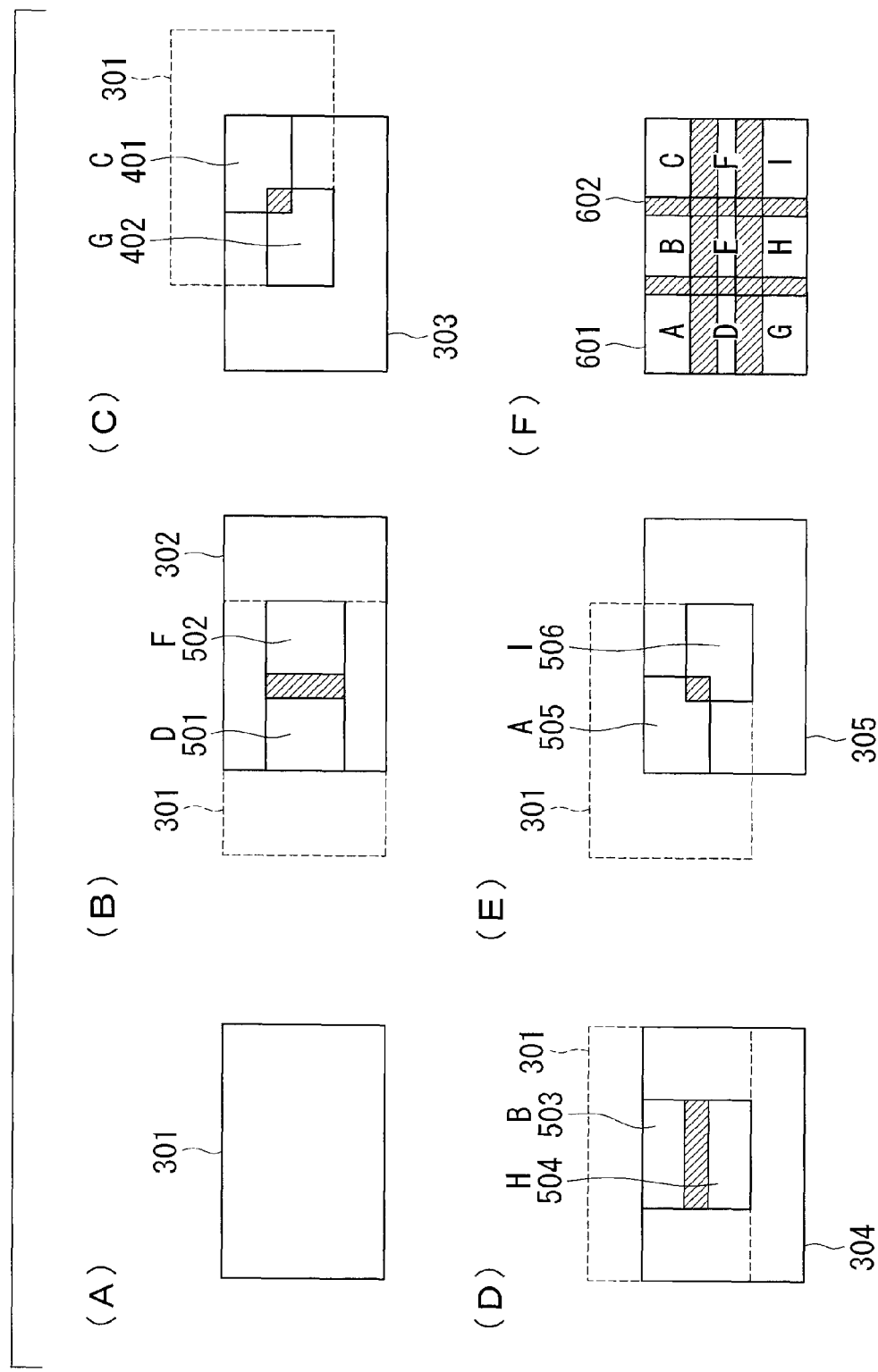
FIG. 7 is an explanatory view representing examples of the reference viewing field image and the peripheral viewing field image.

Note that in step 207 described above, a region that has been set for calculating correction gain is set to be 1/3 of height and width of the reference viewing field image, however weight synchronization may be applied with change as shown in FIG. 7. To be specific, in FIG. 7, a region is not divided in three but they are set larger, and as a result, regions are calculated to overlap each other as shown with a shadow area. An overlapped region 601 is used for correction.

Further, FIG. 8(A) shows a correction gain in a case in which a central region is set to be larger than a drive pitch. In that case, correction gains appear in overlapped manner near a border 602. By applying a weight depending on position to a correction gain near the border 602 for synthesization according to a graph shown in FIG. 8(B), mismatching near the border can be corrected. Further, a seam may be smoothed by using a low-pass filter instead of setting a central region to be larger than a drive pitch.

A correction gain for the entire image is obtained through the processes stated above. As a result, in step 210, an image in which shading has been corrected is obtained by multiplying a reference viewing field image with a correction gain. Furthermore, it is possible to hold a correction gain, and it may be then applied to an image that has been obtained, a live image, or an image for image connection.

As described above, in a microscope system of the embodiment, a reference viewing field image and a plurality of peripheral viewing field images each of which contains a predetermined central region of the reference viewing field image and which have a different viewing field range from each other are captured. Based on the images, a correction gain is calculated for each pixel of the reference viewing field image, and based on the correction gain, the reference viewing field image is applied with shading correction. As a result, it is not required that a sample is escaped out of a field angle or calibration sample dedicated for shading correction is prepared. Consequently shading correction is made with ease and sure.

In short, the imaging device captures the reference viewing field image which is an image of a sample in a predetermined viewing field range, and further captures a plurality of peripheral viewing field images as well by driving any one or both of the optical system and the stage by using an imaging device control section or a drive mechanism control section, which mean drive sections, so that a position of the sample is moved relative to the optical system. Note that, the center of the image obtained by the imaging device is a region that is brightest in the image because it almost matches with an optical axis, therefor that region causes no shading issue. However, an outside region of the image is a dark region which is away from the optical axis, and therefore the region has a shading issue.

To cope with this, as peripheral viewing field images, a plurality of images of peripheral viewing field ranges are captured which contain a predetermined region in a predetermined viewing field range and different from other predetermined viewing field ranges. Then, based on the reference viewing field image and the peripheral viewing field images, a correction gain of each pixel of the reference viewing field image is calculated, and after that based on the correction gain, the reference viewing field image is applied with shading correction. This way, shading correction is performed with ease and sure.

Note that, it is preferred that the imaging device captures a plurality of peripheral viewing field images each of which is an images of peripheral viewing field range containing a predetermined region at the center of the predetermined viewing field range and different from the predetermined viewing field range. As described above, the center of image is the brightest region because the center almost matches with the optical axis. As a result, that region has no shading issue. For this reason, shading correction is efficiently performed by allowing a plurality of peripheral viewing field images to include a predetermined region at the center of the predetermined viewing field range.

Note that, it is possible that a region, where shading does not occur, occurs away from an optical axis because of adjustment error in an optical system or the like. In that case, prior to capturing the reference viewing field image or the peripheral viewing field image, a region where shading does not occur is to be specified. The specification of the region may be performed by a user by inputting a value in an image processing section 9 with the use of an interface device such as a mouse and a keyboard, or may be done by automatic setting according to a condition of the optical system stored in advance in the image processing section 9.

In case a region in which shading does not occur is not specified, as shown in FIG. 9, a reference viewing field image is divided by the size of a specified region 161 for convenience sake, and a peripheral viewing field image is acquired in such a manner as the region 161 overlaps with all other regions in a divided image 160. Here a region division number is assumed to be N. N pieces of peripheral viewing field images at maximum are obtained if all regions are imaged in a case where relative positional relationships are identical, and (N+1)/2 pieces, in minimum, of peripheral viewing field images are obtained if any one of regions is imaged in the case of identical relative positional relationships, in addition to a reference viewing field image. Note that the selected region 161 is not limited to be square, and such graphic as polygon or circle may be employed.

Note that, although FIG. 1 shows a configuration related to observation under transmitted illumination, there is no limitation and observation under epi-illumination may be employed.

Further, driving of the stage 4 is not limited to be performed by the drive mechanism control section 12, and the driving may be performed manually. Furthermore, a driving pitch of the stage 4 is not limited to 1/3 the width and height of the reference viewing field image described above, and it may be 1/N (N is an odd number of 3 or larger). With the drive pitch assumed to be 1/N of width and height, imaging may be only repeated while driving in such a manner as a central region available by dividing an image in N×N overlaps with other regions, with a region 401 and a region 402 in FIG. 5(A) being examples. As with the case of 1/3 pitch described above, only (N×N+1)/2 images are required to be obtained if second imaging is not performed when relative positions of the reference viewing field image and the peripheral viewing field image are identical.

In short, the imaging device control section or the drive mechanism control section, being a drive section, is possible to move a sample position relative to the optical system in height direction and width direction of the reference viewing field image by 1/N (N is odd number) each time, and the imaging device is preferred to image a plurality of peripheral viewing field images each of which is an image of peripheral viewing field range that contains a predetermined range at the center of the predetermined viewing field range and different from other viewing field ranges in at least one of height direction and width direction by deviation of 1/N respectively.

With this configuration, an overlapping region of the reference viewing field range and an interested peripheral viewing field range and a border between them become clear in each peripheral viewing field image, thereby calculation becomes easy when calculating a correction gain. Further, even if a correction gain changes in a discontinuous manner between overlapping regions because of alignment error between the reference viewing field image and the interested peripheral viewing field image, or because of a difference in brightness between central predetermined regions, correction is made easily on the overlapping region and the border. It is to be noted that the correction gain of all pixels of the reference viewing field image can be calculated by capturing $(N^2-1)/2+1$ peripheral viewing field images if calculation of a correction gain is intended for regions corresponding to mutual central predetermined regions based on the reference viewing field image and one peripheral viewing field image.

Not that, determination of the number of obtained images to be obtained is not limited to use the method described above, and N×N pieces in maximum may be captured even if relative positional relationships are identical. In that case, although the time required for acquisition increases, if a drive pitch is made shorter, the size of a region used for correction can be reduced as well, resulting in enhanced correction effect. Thus, variation among samples is reduced because increase in the number of obtained images allows correction on the same region.

Furthermore, although the embodiment described above explains the case in which five peripheral viewing field images are obtained, nine images in total may be obtained which includes a reference viewing field image and eight peripheral viewing field images, being dislocated 1/3 each, for example. Furthermore N×N images may be obtained in the case of the drive pitch being N (N is odd number).

Second Embodiment

Hereinafter, a second embodiment of the present invention will be described in reference to FIG. 10.

Figure 10:
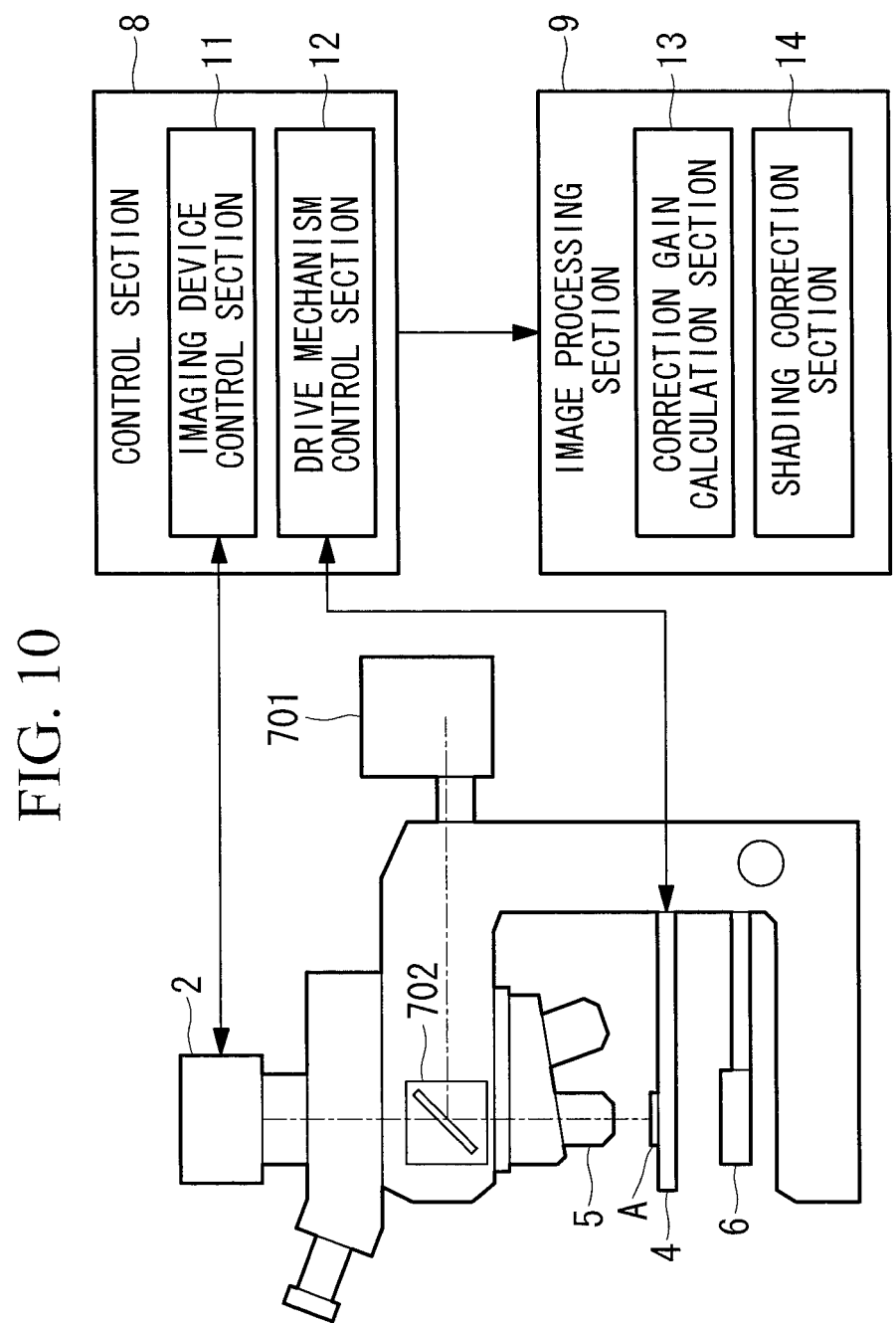
FIG. 10 is an overall configuration diagram representing a microscope system in a second embodiment of the present invention.

A microscope device applied to a microscope system related to the embodiment includes (as shown in FIG. 10), an excitation light source 701 and a fluorescence cube 702. The light from the excitation light source 701 is radiated to a sample A on which fluorescence reagent is applied by way of the fluorescence cube 702 and an objective lens 5. The fluorescence emitted from the sample A is focused on an imaging plane of the imaging device by way of the objective lens 5, the fluorescence cube 702, and a focusing lens which is not shown in a figure.

According to the microscope system described above, shading correction is performed as will be described below. In short, in reference to the flow chart in FIG. 4 described above, alignment is performed between the reference viewing field image and the peripheral viewing field image and then brightness image conversion is performed, and after that decoloration correction is made prior to processing using a low pass filter.

In the decoloration correction, dropping of fluorescence emission caused by decoloration of fluorescence reagent is corrected. A ratio between brightness average values of a central region overlapping 602 as shown in FIG. 8 is used as a decoloration gain, and the gain is applied to all pixels in an interested image for correction. As a result, the change in luminosity across the entire image caused by decoloration is corrected, thereby constructing an image which has no decoloration. It should be noted that, a method of correction for decoloration is not limited to the method described above. A method that utilizes a cumulative histogram, for example, which is disclosed in Japanese Unexamined Patent Application, Publication No. 2011-95073 may be applied.

Figure 11:
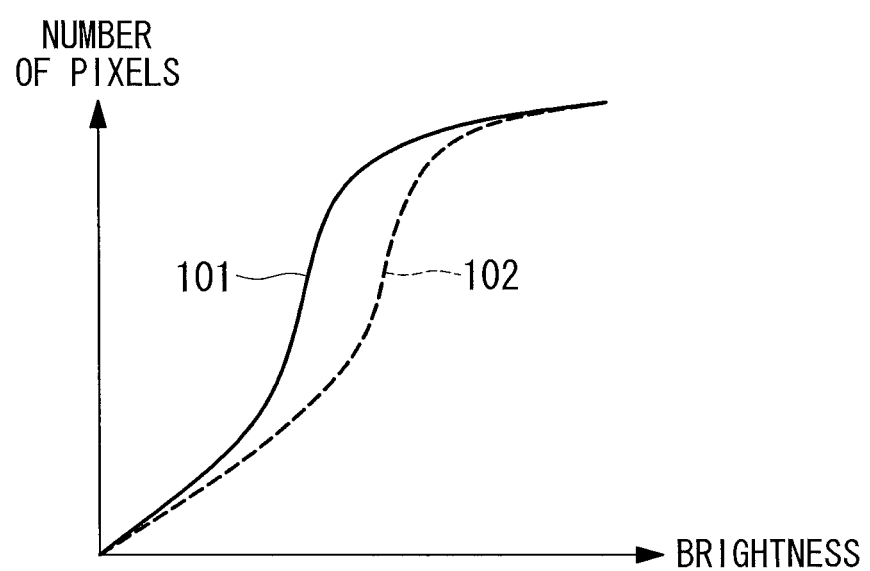
FIG. 11 is a diagram representing a cumulative histogram in which histogram of brightness is integrated.

A principle of decoloration correction that utilizes the cumulative histogram is to be described in reference to FIG. 11. The FIG. 11 shows a cumulative histogram in which a brightness histogram is integrated for the central region overlapping 602 so as not to be affected by shading as described above. A graph 102 shows an image obtained in advance, and the graph 101 shows an image obtained thereafter. It is understood that decoloration has occurred in the graph 101 and notable difference in luminosity appears near the central brightness, however, the brightness is darkening, with little change, in low brightness region and high brightness region.

The fact that luminosity changes depending on brightness like this indicates that a large change caused by decoloration occurs at middle brightness but little change occurs at low brightness because low brightness is a background region, and almost nothing illuminates by such light quantity at high brightness. A decoloration correction is attained by making correction so that the graph 101 agrees with the graph 102. Therefore, based on the cumulative histogram 102 of reference image and the cumulative histogram 101 of an image to be corrected, a lookup table is generated which converts the cumulative histogram 101 of the image to be corrected into a cumulative histogram of a reference image.

In other words, such lookup table is generated as the cumulative histogram 102 of the image to be corrected, having been subjected to gradation correction by using the lookup table, agrees with the cumulative histogram of the reference image. The lookup table is generated for each of RGB. To be specific, the lookup table satisfies relational expression (4) for gradation Iout of a reference image and gradation IIN of an image to be corrected in relational expression (3) shown below, where Iout is the gradation (brightness) to be a reference, Sout (Iout) is cumulative pixel numbers of reference image, IIN is gradation (brightness) of image to be corrected, SIN (IIN) is an image to be corrected, and LUT means input/output relation which the lookup table has.

$$Sout(Iout)=SIN(IIN) \quad (3)$$

$$Iout=LUT[IIN] \quad (4)$$

The gradation of an image to be corrected can be corrected using LUT generated as above, thereby correcting decoloration. Since a portion with little change such as low brightness portion and high brightness portion as described above is not enhanced, it is possible to correct only a region where no fluorescence substance is present or a region of decoloration excluding self fluorescence.

As described above, the microscope system in the embodiment captures the reference viewing field image and a plurality of peripheral viewing field images each of which contains a predetermined region at the center of reference viewing field image and have a viewing field range different from each other. Based on the images, a correction gain is calculated for each pixel of the reference viewing field image, and based on the correction gain, the reference viewing field image is applied with shading correction. As a result, a sample is not required to be escaped from an angle of view, nor, a special calibration sample is required to be prepared for shading correction, resulting in performing of shading correction with ease and sure.

In short, a correction gain calculation section calculates a correction gain for each pixel of the reference viewing field image based on the ratio between brightness of a region of the peripheral viewing field image which overlaps with the reference viewing field image and brightness of a predetermined region at the center of the predetermined viewing field range and the ratio between brightness of a region of the reference viewing field image which overlaps with the peripheral viewing field image and brightness of a predetermined region at the center of the peripheral viewing field range.

Consequently, based on the reference viewing field image and one peripheral viewing field image, a correction gain can be calculated for regions corresponding to mutual central predetermined regions, allowing shading correction with ease and with less amount of calculation.

Third Embodiment

Figure 12:
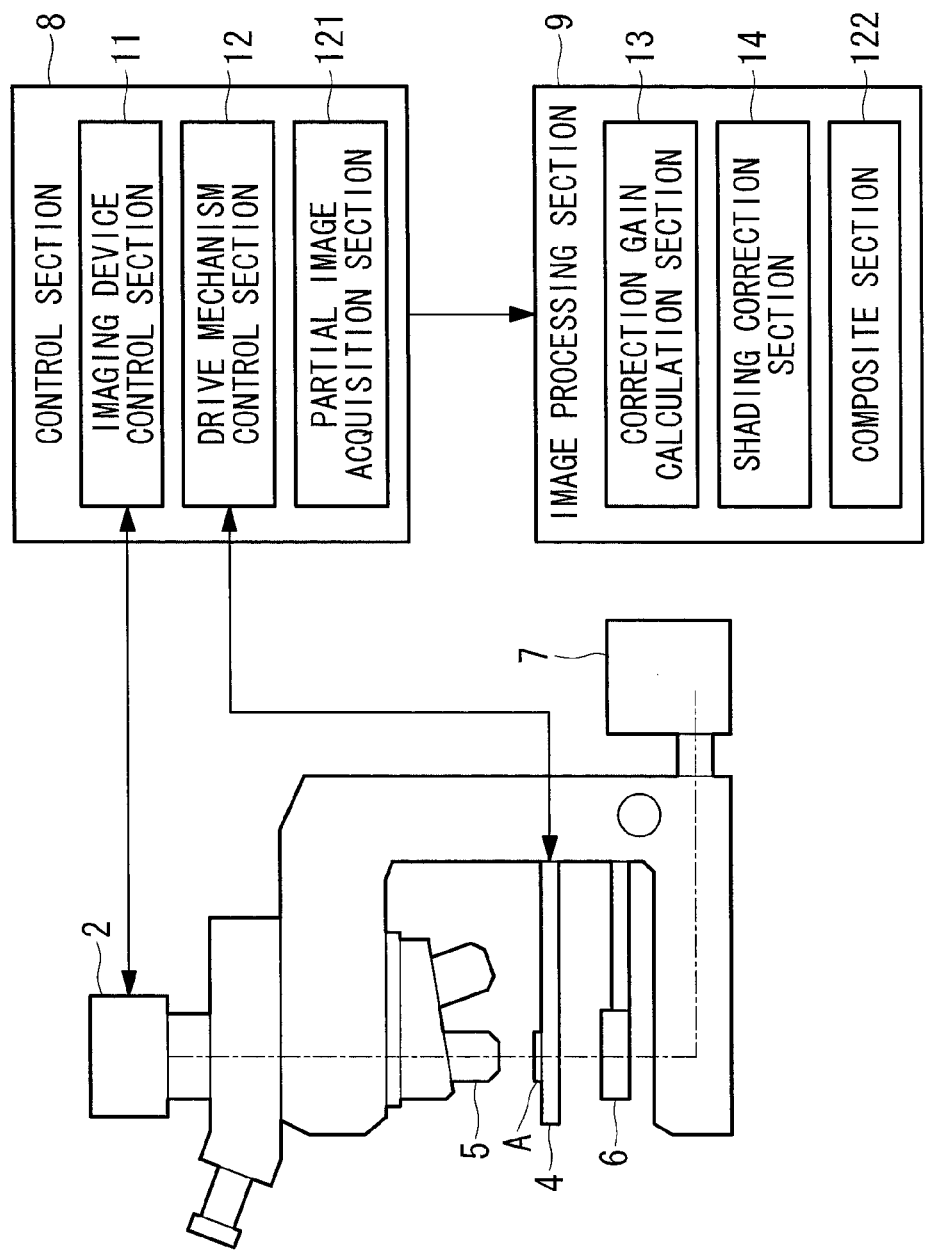
FIG. 12 is an overall configuration diagram representing a microscope system in a third embodiment of the present invention.

A third embodiment of the present invention is described below in reference to FIG. 12.

In the embodiment, a control section 8 includes a partial image acquisition section 121, and in accordance with this, an image processing section 9 includes a composite section 122. The partial image acquisition section 121 is a means for acquiring an image for constructing a wide viewing field image by compositing images together, and it controls a drive mechanism control section 12 for driving for acquiring a partial image so that the images acquired by controlling an imaging device control section 11 overlap each other at image edges.

Figure 13:
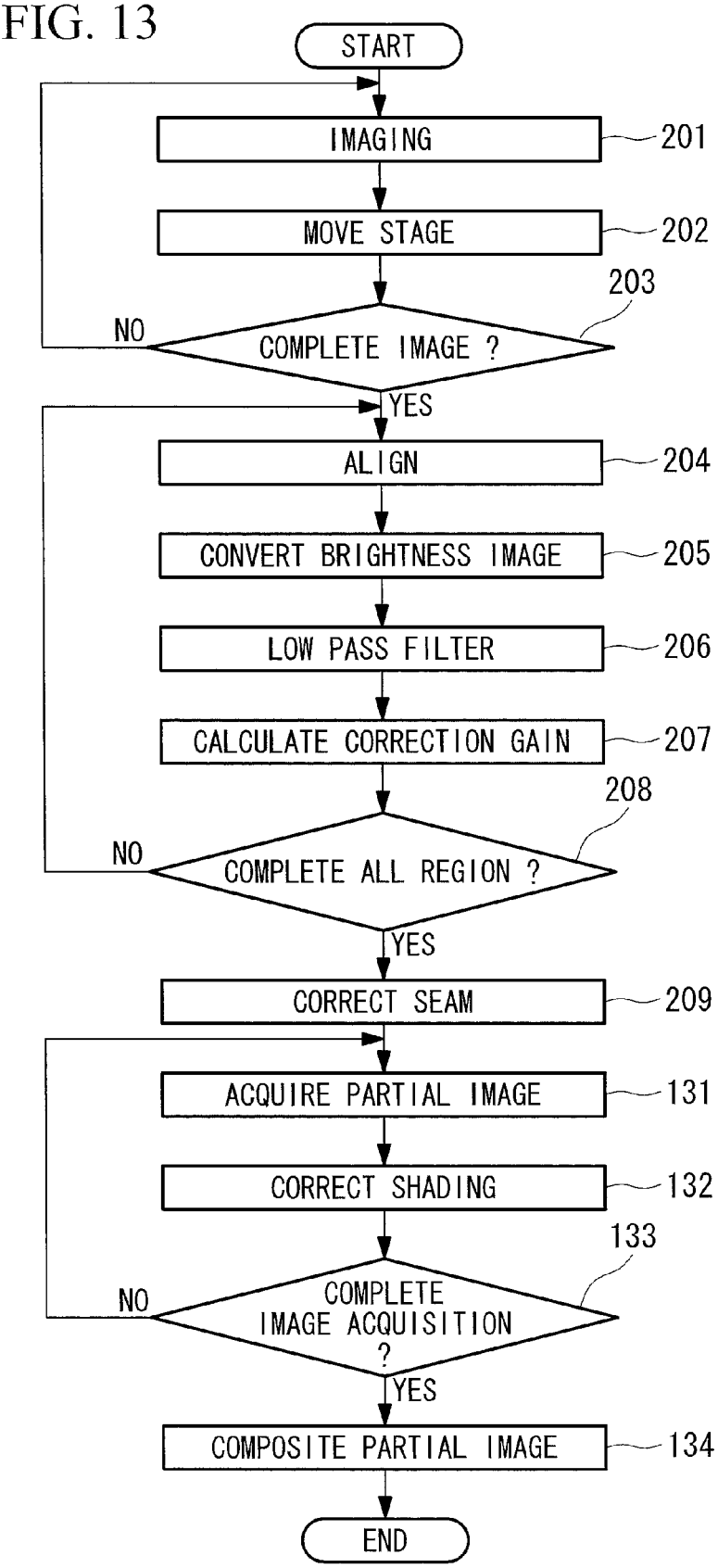
FIG. 13 is a flow chart about shading correction of a microscope system in a third embodiment of the present invention.

Such a microscope system performs shading correction as described below according to a flow chart in FIG. 13. To be specific, a procedure starting from imaging of a reference viewing field image and peripheral viewing field images down to seam correction is performed like in the first embodiment (see step 201 to step 209 in FIG. 4). Therefore, same signs are attached in step 201 to step 209 and related explanation is to be omitted. In the embodiment, after the seam correction, a partial image is obtained by the partial image acquisition section 121.

Figure 14:
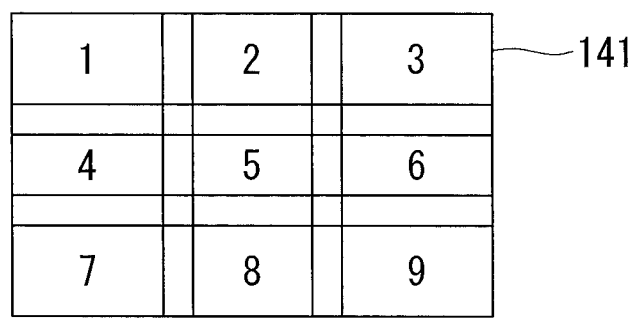
FIG. 14 is an explanatory view representing examples of the reference viewing field image and the peripheral viewing field image.

As shown in FIG. 14, in order to obtain a partial image 141 in step 131, a partial image 2 is captured by driving a stage 4 so that it partially overlaps with a partial image 1, which procedure is repeated until a partial image 9 is captured. Note that, the order of imaging and the number of images are not limited to this, and any order and any number of images may be allowed.

In next step 132, a partial image that has been imaged is corrected by using a correction gain that has been calculated. By this, shading in the partial image is corrected, and unnaturalness is eliminated at a connection part of partial images.

Performing of partial image acquisition and application of shading correction to all partial images means completion of image acquisition 133, to proceed to next step 134. In step 134, partial image compositing is performed. In short, image matching such as template matching is used for aligning overlap of partial images, and then synthesizing is performed. Here, the alignment is not limited to image matching, and a driving amount of the stage 4 may be used. Further, in synthesizing, weight synthesizing as shown in FIG. 8(B) or the like may be performed.

As described above, an image compositing device in the embodiment can construct a composite image having been applied with shading correction, without escaping a sample nor using a dedicated calibration sample. Further, a user can obtain a composite image that has been applied with shading correction automatically with no labor instead of obtaining a calibration image before obtaining the composite image.

REFERENCE SIGNS LIST

1 Microscope device
2 Imaging device
4 Stage
5 Objective lens
6 Condenser unit
7 Light source
8 Control section
9 Image processing section
11 Imaging device control section
12 Drive mechanism control section
13 Correction gain calculation section
14 Shading correction section

The invention claimed is:

1. A microscope system comprising:
a stage configured to support a sample;
an optical system configured to form an image of the sample;
a drive actuator that is configured to drive at least one of the optical system and the stage and is configured to move the sample and the optical system relative to each other;
an imaging sensor configured to capture a reference viewing field image, which is an image of a viewing field range of the sample on the stage, and the imaging sensor is configured to capture a peripheral viewing field image, wherein a first central region, which contains a center of the peripheral viewing field image, overlaps a first peripheral region of the reference viewing field image, wherein a range of peripheral viewing field image is different from the viewing field range, wherein the imaging sensor is configured to cause the drive actuator to move a position of the sample relative to the optical system from the viewing field range of the sample to the range of peripheral viewing field;
a correction gain calculation section that is configured to calculate a correction gain of each pixel in the first peripheral region of the reference viewing field image based on (1) an image of the first peripheral region of the reference viewing field image and (2) an image of the first central region of peripheral viewing field image; and
a correction section that is configured to perform shading correction on the reference viewing field image based on the correction gain calculated by the correction gain calculation section, wherein the correction gain calculation section is configured to calculate the correction gain for each pixel of the first peripheral region of the reference viewing field image based on a ratio between brightness of the first central region of peripheral viewing field image that overlaps the first peripheral region of the reference viewing field image and brightness of the first peripheral region of the reference viewing field image.

2. The microscope system according to claim 1 wherein, the drive actuator is configured to move the position of the sample by 1/N (N is odd number) in a height direction and move the position of the sample by 1/N (N is odd number) in a width direction of the reference viewing field image relative to the optical system, and
wherein the imaging sensor is configured to capture each of the plurality of peripheral viewing field images that are of different ranges from each other, wherein each of the plurality of peripheral viewing field images deviates from the viewing field range at least in height direction by 1/N or width direction by 1/N.

3. The microscope system according to claim 2, wherein the correction gain calculation section calculates a correction gain for each of the plurality of peripheral regions of the reference viewing field image.

4. The microscope system according to claim 1, wherein the correction gain calculation section is configured to calculate a first correction gain of each pixel of the first peripheral region of the reference viewing field image based on an image of the first peripheral region of the reference viewing field image and an image of the first central region of the peripheral viewing field image, the correction gain calculation section is configured to calculate a second correction gain of each pixel in a second peripheral region of the reference viewing field image based on an image of a second peripheral region of the peripheral viewing field image and an image of a second central region of the reference viewing field image, the second central region of the reference viewing field image containing a center of the reference viewing field image and overlaps the second peripheral region of the peripheral viewing field image, and the correction section is configured to perform shading correction on the first peripheral region and the second peripheral region of the reference viewing field image based on the first correction gain and the second correction gain determined by the correction gain calculation section.

* * * * *